United States Patent
Speer et al.

(10) Patent No.: US 11,472,936 B2
(45) Date of Patent: Oct. 18, 2022

(54) METHOD AND FORMULATION FOR AN ISOCYANATE-FREE FOAM USING ISOCYANATE-FREE POLYURETHANE CHEMISTRY

(71) Applicant: Cryovac, LLC, Charlotte, NC (US)

(72) Inventors: Drew V. Speer, Charlotte, NC (US); Yue Sun, Greer, SC (US)

(73) Assignee: Cryovac, LLC, Charlotte, NC (US)

( * ) Notice: Subject to any disclaimer, the term of this patent is extended or adjusted under 35 U.S.C. 154(b) by 129 days.

(21) Appl. No.: 16/970,524

(22) PCT Filed: Feb. 20, 2019

(86) PCT No.: PCT/US2019/018710
§ 371 (c)(1),
(2) Date: Aug. 17, 2020

(87) PCT Pub. No.: WO2019/164900
PCT Pub. Date: Aug. 29, 2019

(65) Prior Publication Data
US 2021/0009781 A1  Jan. 14, 2021

Related U.S. Application Data

(60) Provisional application No. 62/633,277, filed on Feb. 21, 2018.

(51) Int. Cl.
*C08J 9/30* (2006.01)
*C08J 9/14* (2006.01)
*C08L 33/08* (2006.01)

(52) U.S. Cl.
CPC ............ *C08J 9/30* (2013.01); *C08J 9/144* (2013.01); *C08L 33/08* (2013.01); *C08J 2201/022* (2013.01); *C08J 2203/142* (2013.01); *C08J 2203/162* (2013.01); *C08J 2375/04* (2013.01)

(58) Field of Classification Search
CPC ........ C08J 9/144; C08J 9/30; C08J 2201/022; C08J 2203/142; C08J 2203/162; C08J 2375/04; C08L 33/08
See application file for complete search history.

(56) References Cited

U.S. PATENT DOCUMENTS

| | | |
|---|---|---|
| 3,072,613 A | 1/1963 | Whelan et al. |
| 5,019,264 A | 5/1991 | Arthur |
| 5,175,231 A | 12/1992 | Rappoport et al. |
| 5,413,615 A | 5/1995 | Cherpeck |
| 5,684,202 A | 11/1997 | Meier et al. |
| 5,739,251 A | 4/1998 | Venham et al. |
| 6,120,905 A | 9/2000 | Figovsky |
| 6,407,198 B1 | 6/2002 | Figovsky et al. |
| 6,849,669 B1 | 2/2005 | Hodd et al. |
| 6,998,365 B2 | 2/2006 | Ambrose et al. |
| 7,045,577 B2 | 5/2006 | Wilkes et al. |
| 7,232,877 B2 | 6/2007 | Figovsky et al. |
| 7,674,840 B2 | 3/2010 | Stanjek et al. |
| 7,919,540 B2 | 4/2011 | Heuts et al. |
| 7,989,553 B2 | 8/2011 | Birukov et al. |
| 8,017,719 B2 | 9/2011 | Bernard |
| 8,114,157 B2 | 2/2012 | Milbocker et al. |
| 8,143,346 B2 | 3/2012 | Diakoumakos et al. |
| 8,450,413 B2 | 5/2013 | Diakoumakos et al. |
| 8,604,091 B2 | 12/2013 | Olang |
| 8,691,908 B2 | 4/2014 | Yeh et al. |
| 9,359,471 B2 | 6/2016 | Trumbo et al. |
| 9,808,768 B2 | 11/2017 | Vankelecom et al. |
| 10,119,004 B2 | 11/2018 | Cherpeck |
| 2004/0091982 A1 | 5/2004 | Gee et al. |
| 2004/0236119 A1 | 11/2004 | Van Holen |
| 2005/0113594 A1 | 5/2005 | Van Holen |
| 2008/0281006 A1 | 11/2008 | O'Leary et al. |
| 2012/0183694 A1 | 7/2012 | Olang et al. |
| 2012/0208967 A1 | 8/2012 | Birukov et al. |
| 2014/0343182 A1 | 11/2014 | Jin et al. |
| 2015/0024138 A1 | 1/2015 | Figovsky et al. |
| 2015/0197591 A1 | 7/2015 | Pierre et al. |
| 2015/0259470 A1 | 9/2015 | Michaud et al. |
| 2015/0299390 A1 | 10/2015 | Michaud et al. |
| 2016/0083501 A1* | 3/2016 | Grun .............. C07D 317/36 528/48 |
| 2016/0122473 A1* | 5/2016 | Monnier .......... C08G 71/04 523/400 |
| 2017/0342024 A1* | 11/2017 | Monnier .......... C09D 4/00 |

FOREIGN PATENT DOCUMENTS

| | | |
|---|---|---|
| EP | 1070733 A1 | 1/2001 |
| EP | 2735585 A1 | 5/2014 |
| EP | 3199569 A1 | 8/2017 |
| WO | 03028644 A2 | 4/2003 |
| WO | 2007062812 A1 | 6/2007 |
| WO | 2011147812 A1 | 12/2011 |
| WO | 2013093346 A1 | 6/2013 |
| WO | 2013101682 A1 | 7/2013 |
| WO | 2014052644 A1 | 4/2014 |

\* cited by examiner

Primary Examiner — John M Cooney
(74) Attorney, Agent, or Firm — Jason R. Womer

(57) ABSTRACT

The presently disclosed subject matter is directed to a method of making a foam. The disclosed formulation has a first part with at least one multifunctional acrylate. The disclosed formulations have a second part with at least one non-isocyanate polyurethane oligomer derived from a reaction of at least one multifunctional cyclocarbonate and at least one first multifunctional amine, and a second multifunctional amine. The formulation may also have a blowing agent and at least one surfactant.

18 Claims, No Drawings

METHOD AND FORMULATION FOR AN ISOCYANATE-FREE FOAM USING ISOCYANATE-FREE POLYURETHANE CHEMISTRY

BACKGROUND

The presently disclosed subject matter relates generally to methods of making isocyanate-free foam using isocyanate-free polyurethane chemistry.

It is known to produce foam from a reactive mixture of one or more polyols and one or more isocyanates. Isocyanates are highly reactive and toxic chemicals and new warning label requirements are being implemented. It is desirable to move away from the use of isocyanates where there is a potential for worker or consumer exposure. There are foams that use alternate chemistries to produce urethane linkages without using isocyanates. The presently disclosed matter offers methods of making isocyanate-free foams and the resulting isocyanate-free foam does not rely on urethanes to produce the foam.

SUMMARY

The presently disclosed subject matter is directed to a method of making a foam and the foam thereof. The method may include providing a formulation. In some embodiments, the formulation for making the foam may have a first part with 25% to 70% of at least one multifunctional acrylate. The formulation may also include a second part with 30% to 50% of at least one non-isocyanate polyurethane (NIPU) oligomer. The NIPU oligomer may be derived from a reaction of at least one multifunctional cyclocarbonate and at least one first multifunctional amine. The second part may also comprise 15% to 40% of a second multifunctional amine, 5% to 35% of a blowing agent. The blowing agent may be included in the first part, the second part, or both the first and the second part. The second part may also have 0.1% to 7% of at least one surfactant. The at least one surfactant may be included in the first part, the second part, or both the first and the second part. The method may also include combining the first part and the second part of the formulation to create a froth. The method may further include curing the froth to produce a foam. In some embodiments, the first part may be separated from the second part.

DETAILED DESCRIPTION

Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long standing patent law convention, the terms "a", "an", and "the" refer to "one or more" when used in the subject application, including the claims. Thus, for example, reference to "a formulation" includes a plurality of such formulations, and so forth.

Unless indicated otherwise, all numbers expressing quantities of components, reaction conditions, and so forth used in the specification and claims are to be understood as being modified in all instances by the term "about." Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, percentage, and the like can encompass variations of, and in some embodiments, ±20%, in some embodiments ±10%, in some embodiments ±5%, in some embodiments ±1%, in some embodiments ±0.5%, in some embodiments ±0.1%, and in some embodiments ±0.01%, from the specified amount, as such variations are appropriated in the disclosed foam and methods.

As used herein, the term "additive" refers to any substance, chemical, compound or formulation that is added to an initial substance, chemical, compound, or formulation in a smaller amount than the initial substance, chemical, compound, or formulation to provide additional properties or to change the properties of the initial substance, chemical, compound, or formulation.

As used herein, "acrylate" includes acrylates, methacrylates, and molecules having combinations of acrylate and methacrylate functionalities. "Acrylate functionality" includes functionality provided by any of acrylate and methacrylate moieties. "Acrylate moieties" includes acrylate and methacrylate moieties. As used in this context, "acrylate functionality" refers to the number of acrylate moieties on the molecule.

As used herein, "froth" is the expanded mixture at the initial period of the curing process (i.e., polymerization process) comprising the multifunctional acrylate(s), non-isocyanate polyurethane (NIPU) oligomer(s), multifunctional cyclocarbonate(s), multifunctional amine(s), surfactant(s), and other components and a plurality of cells within the mixture created by carbon dioxide and/or other gases that have come out of solution or have vaporized in response to the decrease in pressure or an increase in temperature. The froth exists before curing has been completed. The froth is a nascent foam. The transition from froth to foam may be defined as the point in the curing process where the cellular structure takes on a particular amount (e.g. approximately 80%) of its final properties such as density or compressive strength, or both density and compressive strength.

Copolymers can be identified, i.e., named, in terms of the monomers from which the copolymers are produced. For example, the phrase "propylene/ethylene copolymer" refers to a copolymer produced by the copolymerization of both propylene and ethylene, with or without additional comonomer(s). A copolymer comprises recurring "mer" units derived from the monomers from which the copolymer is produced, e.g., a propylene/ethylene copolymer comprises propylene mer units and ethylene mer units.

All formulation percentages used herein are presented on a "by weight" basis, unless designated otherwise.

Although the majority of the above definitions are substantially as understood by those of skill in the art, one or more of the above definitions can be defined herein above in a manner differing from the meaning as ordinarily understood by those of skill in the art, due to the particular description herein of the presently disclosed subject matter.

Formulation

The presently disclosed subject matter is directed to methods of making a foam and the foam thereof. The foam may be a thermoset foam. A formulation may be provided to make the foam. The formulation may have at least one multifunctional acrylate. In some embodiments, the formulation for making the foam may have a first part with at least one multifunctional acrylate. In other embodiments, the formulation for making the foam may have a first part with 25% to 70% of at least one multifunctional acrylate. In some embodiments, the formulation may also include a second part with at least one non-isocyanate polyurethane (NIPU) oligomer. The formulation may also include a second part with 30% to 50% of at least one NIPU oligomer. The NIPU oligomer may be derived from a reaction of at least one multifunctional cyclocarbonate and at least one first multifunctional amine prepared in such a manner that the oligomer is predominately amine terminated. In some embodiments, the second part may also comprise a second multifunctional amine. The second part may also include a blowing agent. The second part may comprise 15% to 40% of a second multifunctional amine, 5% to 35% of a blowing agent. The blowing agent may be included in at least one of the first part and the second part. The second part may further include at least one surfactant. The second part may also have 0.1% to 7% of at least one surfactant. The at least one surfactant may be included in at least one of the first part and the second part. The method may also include combining the first part and the second part of the formulation to create a froth. The method may further include curing the froth to produce a foam. In some embodiments, the first part may be separated from the second part.

The formulation may be in two parts: a first part and a second part. In some embodiments, the formulation may not be in two parts. The first part may be referred to as the A-side or part A. The second part may be referred to as the B-side or part B. The first part and the second part may be isolated from one another until combining the first part and the second part to create a froth is desired. A gaseous blowing agent may be generated. In some embodiments, the blowing agent is a physical blowing agent and is not chemically generated.

The formulation for making a foam may include at least one multifunctional acrylate. The at least one multifunctional acrylate may be dipentaerythritol hexaacrylate, dipentaerythritol pentaacrylate, dipropylene glycol diacrylate, ditrimethylolpropane pentaacrylate, pentaerythritol tetraacrylate, polyethylene glycol (400) diacrylate, trimethylolpropane triacrylate, tris (2-hydroxy ethyl) isocyanurate triacrylate, or combinations thereof. The acrylate may be, acrylated polyester oligomers, bisphenol A diacrylates, dipropylene glycol diacrylate, epoxy acrylates, ethoxylated trimethylolpropane triacrylate (TMPTA), isobornyl acrylate, PEG 400 diacrylate, PEG 600 diacrylate, PEG 1000 dimethacrylate, pentaerythritol tetraacrylate, polyester acrylate, polyester acrylate oligomer, polyethylene glycol diacrylates, polypropylene glycol diacrylates, propylene glycol diacrylates, propoxylated trimethylolpropane triacrylate, trimethylolpropane triacrylate, tripropylene glycol diacrylate, tris (2-hydroxyethyl)isocyanurate triacrylate, zinc diacrylate, ethoxylated pentaerythritol tetraacrylate (SR494), dipentaerythritol pentaacrylate (SR399), dipentaerythritol, hexaacrylate, or combinations thereof. In some embodiments, the at least one multifunctional acrylate may be dipentaerythritol pentaacrylate or dipentaerythritol hexaacrylate. In other embodiments, the at least one multifunctional acrylate may be dipentaerythritol pentaacrylate and dipentaerythritol hexaacrylate.

The at least one multifunctional acrylate may comprise diacrylate, that is, molecules having two acrylate functionality sites. Useful diacrylates include, for example, one or more of polyethylene glycol diacrylates, polypropylene glycol diacrylates, bisphenol A diacrylates, diacrylates derived from vegetable oil, and polyester diacrylates.

Useful polyethylene glycol (PEG) diacrylate include PEG 200 diacrylate, PEG 400 diacrylate, and PEG 1000 diacrylate where the numbers represent the average molecular weight of the PEG segment.

Useful polypropylene glycol diacrylates include dipropylene glycol diacrylate, and tripropylene glycol diacrylate.

Useful bisphenol A diacrylates include ethoxylated bisphenol A diacrylate, such as those having 2, 3, and 4 or more moles of ethoxylation, and including bisphenol diacrylates and bisphenol A dimethacrylates.

The first part may have 15% to 90% of at least one multifunctional acrylate. The first part may have 25% to 70% of at least one multifunctional acrylate. The first part may have 15%, 20%, 25%, 30%, 35%, 40%, 45%, 50%, 55%, 60%, 65%, 70%, 75%, 80%, 85%, 90% of at least one multifunctional acrylate, or any range between these values.

The first part may further comprise one or more multifunctional epoxy compound. Useful multifunctional epoxy compounds include bisphenol A diglycidyl ether, bisphenol F diglycidyl ether, trimethylolpropane triglycidyl ether, neopentyl glycol diglycidyl ether, resorcinol diglycidyl ether and the like. The first part may further comprise one or more multifunctional cyclic carbonate derived from any of the afore mentioned epoxy compounds; for example, trimethylolpropane triglycidyl carbonate.

The formulation for making a foam may include at least one non-isocyanate polyurethane (NIPU) oligomer. The NIPU may be derived from a reaction of at least one multifunctional cyclocarbonate and at least one first multifunctional amine. The NIPU may be amine terminated. The at least one multifunctional cyclocarbonate may be trimethylolpropane triglycidyl carbonate, resorcinol diglycidyl carbonate, neopentyl glycol diglycidyl carbonate, bisphenol A diglycidyl carbonate, bisphenol F diglycidyl carbonate, and the like. The at least one first multifunctional amine may be isophorone diamine, meta-xylylenediamine, piperazine, 1-(2-aminoethyl)piperazine, diethylenetriamine, triethylenetetramine, tetraethylenepentamine, 2-methyl-1,5-pentanediamine, N,N'-bis-(3-aminopropyl)ethylenediamine, 2,2,4-(and 2,4,4-)trimethylhexane-1,6-diamine, or combinations thereof.

The second part may have 20% to 70% of at least one NIPU oligomer. The second part may have 30% to 50% of at least one NIPU oligomer. The second part may have 20%, 25%, 30%, 35%, 40%, 45%, 50%, 55%, 60%, 65%, 70% of at least one NIPU oligomer, or any range between these values.

The formulation for making a foam may include a second multifunctional amine. The second multifunctional amine may be isophorone diamine, meta-xylylenediamine, piperazine, 1-(2-aminoethyl)piperazine, diethylenetriamine, triethylenetetramine, tetraethylenepentamine, 2-methyl-1,5-pentanediamine, N,N'-bis-(3-aminopropyl)ethylenediamine, 2,2,4-(and 2,4,4-)trimethylhexane-1,6-diamine, or combinations thereof. In some embodiments, the second multifunctional amine may be isophorone diamine. In other embodiments, the at least one first multifunctional amine may be the same as the second multifunctional amine.

The second part may have 10% to 50% of a second multifunctional amine. The second part may have 15% to 40% of a second multifunctional amine. The second part may have 10%, 15%, 20%, 25%, 30%, 35%, 40%, 45%, 50% of a second multifunctional amine, or any range between these values.

The formulation for making a foam may include a blowing agent. The blowing agent may be acetone, carbon dioxide, dimethoxymethane, nitrogen, ammonium bicarbonate, potassium bicarbonate, sodium bicarbonate, hydrocarbons, hydrofluorocarbons, hydrofluoroolefins, water, or combinations thereof.

The formulation may include a physical or chemical blowing agent. The blowing agent may be acetone, cyclopentane, carbon dioxide, dimethoxymethane, nitrogen, ammonium bicarbonate, potassium bicarbonate, sodium bicarbonate, hydrocarbons, hydrofluorocarbons, hydrofluoroolefins, water, or combinations thereof. In some embodiments, the blowing agent may be a chemical blowing agent. In other embodiments, the blowing agent may be a physical blowing agent.

A physical blowing agent is a blowing agent that does not require a chemical reaction to generate the foaming gas or vapor, the latter being characterized as a chemical blowing agent. Useful physical blowing agents include one or more of inorganic blowing agents and organic blowing agents. Preferred blowing agents will have a sufficient solubility in the reactants to produce a low density foam. The solubility of gaseous blowing agents will typically increase with applied pressure.

The blowing agent may be a physical blowing agent. The blowing agent may be a hydrofluorocarbon, such as 1,1,1,3,3-pentafluoropropane, 1,1,difluoroethane, and 1,1,1,3,3,-pentafluorobutane. The blowing agent may be a hydrohaloolefin such as trans-1,3,3,3-tetrafluoroprop-1-ene, trans-1-chloro-3,3,3-trifluoropropene, and 1,1,1,4,4,4,-hexafluorobut-2-ene.

Useful inorganic blowing agents include one or more of carbon dioxide, nitrogen, argon, water, air, sulfur hexafluoride (SF(6)), and helium. For example, the formulation may comprise dissolved carbon dioxide. The solubility of carbon dioxide will typically increase with increasing pressure.

Useful organic blowing agents include one or more of aliphatic hydrocarbons having 1-9 carbon atoms, aliphatic alcohols, esters and ethers having 1-3 carbon atoms, fully and partially halogenated aliphatic hydrocarbons (e.g., those having 1-4 carbon atoms), hydrofluorocarbons (HFCs), chlorofluorocarbons, hydrochlorofluorocarbons, esters such as methyl formate, methyl acetate, ethers such as dimethyl ether, diethyl ether, and ketones, such as acetone.

Aliphatic hydrocarbons include methane, ethane, propane, n-butane, isobutane, n-pentane, isopentane, neopentane, cyclopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbon blowing agents include methyl fluoride, perfluoromethane, ethyl fluoride, 1,1-difluoroethane (HFC-152a), fluoroethane (HFC-161), 1,1,1-trifluoroethane (HFC-143a), 1,1,1,2-tetrafluoroethane (HFC-134a), 1,1,2,2-tetrafluoroethane (HFC-134), 1,1,1,3,3-pentafluoropropane, pentafluoroethane (HFC-125), difluoromethane (HFC-32), perfluoroethane, 2,2-difluoropropane, 1,1,1-trifluoropropane, 1,1,1,3,3-pentafluoropropane (HFC-245a), perfluoropropane, dichloropropane, difluoropropane, perfluorobutane, and perfluorocyclobutane. Partially halogenated chlorocarbons and chlorofluorocarbon blowing agents include methyl chloride, methylene chloride, ethyl chloride, 1,1,1-trichloroethane, 1,1-dichloro-1 fluoroethane (HCFC-141 b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,2-dichlorotetrafluoroethane (CFC-114), chloroheptafluoropropane, and dichlorohexafluoropropane.

The blowing agent may comprise one or more of the foregoing blowing agents used alone or in combination. For example, the blowing agent may comprise a blend of isobutane and n-butane. In other embodiments, the blowing agent may be at least one of a hydrofluorocarbon and a hydrofluoro olefin.

In some embodiments, the blowing agent may be in the first part of the formulation. In other embodiments, the blowing agent may be in the second part of the formulation. In further embodiments, the blowing agent may be in the first part and the second part of the formulation.

The formulation may have 5% to 50% of a blowing agent. The formulation may have 5% to 35% of a blowing agent. The formulation may have 5%, 6%, 7%, 8%, 9%, 10%, 11%, 12%, 13%, 14%, 15%, 20%, 25%, 30%, 35%, 40%, 45%, 50% of a blowing agent, or any range between these values.

The formulation for making a foam may include at least one surfactant. The at least one surfactant may include alkoxylated polysiloxanes (i.e., silicone surfactants and propoxylated and/or ethoxylated polysiloxane), ethoxylated fatty acids, salts of fatty acids, ethoxylated fatty alcohols, salts of sulfonated fatty alcohols, fatty acid esters of sorbitan, and fatty acid ester sorbitan ethoxylates (e.g., polysorbates available from Croda under the Tween and Span trade names), silicon glycol copolymer, or combinations thereof. In some embodiments, the at least one surfactant may be Tegostab materials from Evonik. In some embodiments, the at least one surfactant may be a polysiloxane-based surfactant. In other embodiments, the at least one surfactant may be a silicon glycol copolymer.

In some embodiments, the at least one surfactant may be in the first part of the formulation. In other embodiments, the at least one surfactant may be in the second part of the formulation. In further embodiments, the at least one surfactant may be in the first part and the second part of the formulation.

The formulation may have 0.1% to 15% of a surfactant. The formulation may have 0.1% to 7% of a surfactant. The formulation may have 0.1%, 0.3%, 0.5%, 0.6%, 0.7%, 0.8%, 0.9%, 1%, 1.2%, 1.4%, 1.5%, 1.75%, 2%, 2.5%, 3.0%, 3.5%, 4.0%, 4.5%, 5.0%, 5.5%, 6%, 6.5%, 7%, 8%, 9%, 10%, 11%, 12%, 13%, 14%, 15% of a surfactant, or any range between these values.

The formulation for making a foam may include an epoxy compound. The epoxy compound may be bisphenol A diglycidyl ether, bisphenol F diglycidyl ether, trimethylolpropane triglycidyl ether, neopentyl glycol diglycidyl ether, resorcinol diglycidyl ether, or combinations thereof. The first part may further comprise one or more multifunctional cyclic carbonate derived from any of the afore mentioned epoxy compounds; for example, trimethylolpropane triglycidyl carbonate. In some embodiments, the epoxy compound may be bisphenol F diglycidyl ether.

The foam may have 2%, 5%, 6%, 8%, 9%. 9.29%, 10%, 12%, 14%, 14.8%, 15%, 16%, 18%, 20% epoxy compound. The foam may have 14.8% bisphenol F diglycidyl ether. The foam may have 9.29% bisphenol F diglycidyl ether.

In some embodiments, the epoxy compound may be in the first part of the formulation. In other embodiments, the epoxy compound may be in the second part of the formulation. The epoxy cannot be in the part with the NIPU oligomer and/or amine because the epoxy will react with the NIPU oligomer and/or amine and cure. In some embodiments, Part A has the acceptor molecules: acrylate, epoxy, carbonate and Part B has the donor molecules, which are amines. The foam may have 14.8% bisphenol F diglycidyl ether in the first part. The foam may have 9.29% bisphenol F diglycidyl ether in the first part.

The formulation for making a foam may include an additive. The formulation for making a foam may include a plurality of additives. The additive may be catalysts, cure promoters, dyes, flame retardants, foaming agents, functionalized filler, reactive filler, reinforcing agents, nucleating agents, perfumes, pigment dispersing agents, odor inhibitors, or combinations thereof. In some embodiments, the nucleating agent may be halloysite, powdered paper, silica, alumina, aluminum trihydrate, sodium cloisite, wood pulp, wood fiber, or combinations thereof. The nucleating agent may be a reactive filler. The nucleating agent may be a silica. The formulation may have less than 1 wt % of a reactive filler. The flame retardant may be aluminum trihydrate (ATH), tricresyl phosphate, and triethyl phosphate.

In some embodiments, the formulation may have 1 wt %, 1.25 wt %, 1.5 wt %, 1.75 wt %, 2 wt %, 2.25 wt %, 2.5 wt %, 2.75 wt %, 3 wt % nucleating agent, or any range between these values. The nucleating agent may be a silica. The silica may be hydrophobic fumed silica, hydrophilic fumed silica, synthetic amorphous silica, or a combination thereof. The fumed silica may have surface reactive methacrylate groups. The formulation may have 1 wt % synthetic silica. The formulation may have 1 wt % hydrophobic fumed silica. The formulation may have 2.5 wt % hydrophobic fumed silica. In some embodiments, the nucleating agent may be in the first part of the formulation. In other embodiments, the nucleating agent may be in the second part of the formulation. In further embodiments, the nucleating agent may be in the first part and the second part of the formulation.

In some embodiments, a catalyst acts as a cure promoter. The catalyst may increase the rate of cure. The cure promoter may be an amine, a metal salt, and imidazole. The amine may be aromatic or aliphatic. The amine may be 1,4-diazabicyclo[2.2.2]octane (DABCO), 1,8-Diazabicyclo[5.4.0]undec-7-ene (DBU), 1,5-diazabicyclo[4.3.0]non-5-ene (DBN), 1,5,7-triazabicyclo[4.4.0]dec-5-ene (TBD), and tetramethylguanidine (TMG). The cure promoter may also be a transition metal salt, such as tin octanoate, tin(II) 2-ethylhexanoate, bismuth nitrate, zinc oxide, zinc acetate, copper propionate, ceric ammonium nitrate, bismuth 2-ethylhexanoate, boric acid and sodium borate. In some embodiments the catalyst is an imidazole such as 2-ethyl-4-methyl-1H-imiazole.

The formulation may have 0.5 wt % to 5 wt % catalyst. The formulation may have 0.5 wt %, 0.75 wt %, 1 wt %, 1.25 wt %, 1.5 wt %, 1.75 wt %, 2 wt %, 3.25 wt %, 4.25 wt %, 4.5 wt %, 5 wt % catalyst, or any range between these values. The formulation may have 0.75 wt % catalyst. In some embodiments, the formulation may have 2.5 wt % catalyst. The catalyst may be in the first part of the formulation. The catalyst may be in the second part of the formulation.

Method

The foam may be made using isocyanate-free polyurethane chemistry that may be suitable for use in packaging applications, cold chain applications, and insulation applications. Polyurethanes may be prepared without isocyanates from the reaction of cyclocarbonates with amines. In some embodiments, polyurethanes may be prepared without isocyanates from the reaction of multifunctional cyclocarbonates with multifunctional amines. This reaction is relatively slow and typically not sufficiently exothermic to drive a foaming process (e.g. vaporizing a physical blowing agent) and to rise and cure in the time that may be required of some applications such as on-demand packaging foams (e.g. less than 2 minutes). The reaction of multifunctional cyclocarbonates with an excess of multifunctional amines can form amine-terminated polyurethane oligomers. The amine-terminate polyurethane oligomers can then be cured by a kinetically faster and more exothermic reaction. Non-limiting examples of these reactions may be aza Michael addition, amine anhydride addition, or amine-epoxy addition.

The method of making a foam may include providing a formulation. The foam may be a thermoset foam. The formulation may be a liquid formulation. The formulation may include at least one multifunctional acrylate, at least one NIPU oligomer that may be derived from a reaction of at least one multifunctional cyclocarbonate and at least one first multifunctional amine, a second multifunctional amine, a blowing agent, and at least one surfactant. The formulation may have a first part and a second part. The first part may have at least one multifunctional acrylate. In some embodiments, the first part may have at least one multifunctional acrylate. The first part may further include an epoxy compound, at least one multifunctional cyclocarbonate, and an anhydride compound. The first part may have only an epoxy compound. The first part may have only at least one multifunctional acrylate and an epoxy compound.

The second part may have at least one NIPU derived from a reaction of at least one multifunctional cyclocarbonate and at least one multifunctional amine. The second part may also have a second multifunctional amine. The second part may also have a surfactant. The second part may further have a blowing agent. In some embodiments, the first part may be separated from the second part.

Preparation of Multifunctional Cyclocarbonates

Any suitable method may be used to prepare multifunctional cyclocarbonates. In some embodiments, one method may be a high-pressure method using a pressure reactor. In other embodiments, a second method may be a low-pressure method using glassware. Both methods may use catalysts. The multifunctional cyclocarbonates that were produced using the low-pressure and high-pressure methods may be prepared from neopentyl glycol diglycidyl ether, resorcinol diglycidyl ether, cyclohexane dimethanol diglycidyl ether, bisphenol F diglycidyl ether, bisphenol A diglycidyl ether, trimethylolpropane triglycidyl ether, and combinations thereof.

In some embodiments, a high-pressure method may be used to prepare multifunctional cyclocarbonates. The high-pressure method may use a pressure reactor. The first ingredient may be any suitable epoxy compound such as trimethylolpropane triglycidyl ether, neopentyl glycol diglycidyl ether, resorcinol diglycidyl ether, cyclohexane dimethanol diglycidyl ether, bis phenol F diglycidyl ether, or combinations thereof. The first ingredient may be added to a pressure reactor. The pressure reactor may be a Parr reactor. A catalyst may be used. The catalyst may be tetrabutylammonium bromide, iodide, or combinations thereof. The first ingredient and the catalyst may be added to the reactor. The reactor may be stirred by any suitable means such as mechanical stirrer, or magnetic stirrer. The first ingredient and the catalyst may be stirred, heated, and then cooled. The pressure reactor may be purged at least one time with a volume of carbon dioxide.

The pressure reactor may be purged twice, 3 times, 4 times, 5 times, 6 times, 7 times, 8 times, 9 times, 10 times, or any range between these values with a gas. The pressure reactor may have a carbon dioxide pressure system. The temperature of the pressure reactor may be increased to 50°

C., 55° C., 60° C., 65° C., 70° C., 75° C., 80° C., 85° C., 90° C., 95° C., 100° C., 110° C., 120° C., 130° C., 140° C., 145° C., 150° C., 155° C., 160° C., 165° C., 175° C. ,185° C., 195° C., or any range between these values. The temperature of the pressure reactor may be increased to 145° C. The temperature of the pressure reactor may be raised under 100 psi of $CO_2$ pressure, 150 psi of $CO_2$ pressure, 200 psi of $CO_2$ pressure, 250 psi of $CO_2$ pressure, 300 psi of $CO_2$ pressure, 350 psi of $CO_2$ pressure, 400 psi of $CO_2$ pressure, 450 psi of $CO_2$ pressure, 500 psi of $CO_2$ pressure, 550 psi of $CO_2$ pressure, 600 psi of $CO_2$ pressure, or any range between these values. The temperature of the pressure reactor may be increased to 145° C. under 400 psi of $CO_2$ pressure. The result of this high-pressure method yielded at least one multifunctional cyclocarbonate.

In some embodiments, a low-pressure method may be used to prepare multifunctional cyclocarbonates. The low-pressure method may use a glass flask to prepare the multifunctional cyclocarbonates. The first ingredient may be any suitable epoxy compound such as trimethylolpropane triglycidyl ether, neopentyl glycol diglycidyl ether, resorcinol diglycidyl ether, cyclohexane dimethanol diglycidyl ether, bis phenol F diglycidyl ether, or combinations thereof. The first ingredient may be added to a glass flask. A catalyst may be used. The catalyst may be tetrabutylammonium bromide, iodide, or combinations thereof. The first ingredient and the catalyst may be added to the glass flask. The glass flask may be stirred by any suitable means such as mechanical stirrer, or magnetic stirrer. An oil bubbler may be added to the glass flask. Gas may be bubbled into the liquid mixture of the first ingredient and/or the catalyst. The gas may be bubbled at nominally atmospheric pressure. The gas may be carbon dioxide.

The temperature of the flask may be increased with a heating element. The heating element may be a heating mantle. The temperature may be increased to 50° C., 55° C., 60° C., 65° C., 70° C., 75° C., 80° C., 85° C., 90° C., 95° C., 100° C., 110° C., 120° C., 130° C., 140° C., 145° C., 150° C., 155° C., 160° C., 165° C., 175° C.,185° C., 195° C., or any range between these values. The temperature of the flask may be increased to 130° C. The temperature increase may be maintained for 2 hours, 5 hours, 10 hours, 12 hours, 14 hours, 16 hours, 18 hours, 20 hours, 22 hours, 24 hours, 26 hours, 28 hours, 30 hours, 32 hours, 34 hours, 36 hours, 40 hours, 48 hours, or any range between these values. The temperature of the pressure reactor may be increased to 130° C. and maintained for 28 hours. The result of this low-pressure method yielded at least one multifunctional cyclocarbonate.

Preparation of NIPU Oligomers

Different methods may be used to prepare NIPU oligomers. In some embodiments, a one-step process may be used. In other embodiments, a multi-step process may be used. The multi-step process may be a two-step process. The oligomers may be miscible with water. Water may be used as an economical solvent that does not need to be removed to make a foam. The NIPU oligomers may be amine-terminated NIPU oligomers.

The one-step process may mix together the at least one multifunctional cyclocarbonate prepared from the above method for preparing a multifunctional cyclocarbonate with at least one multifunctional amine. The at least one multifunctional cyclocarbonate may be trimethylolpropane triglycidyl carbonate (TMPTGC). The at least one multifunctional cyclocarbonate may be added to the at least one first multifunctional amine in a manor such that the amine is in stoichiometric excess. The at least one first multifunctional amine may be meta-xylylenediamine (MXDA). The ratio of at least one multifunctional cyclocarbonate to at least one first multifunctional amine may be 1:3, 1:4, 1:5, 1:6, 1:7, 1:8, 1:9, 1:10 mol ratio, or any mol ratio between these values. In some embodiments, the ratio may be 1:6 mol ratio. The at least one multifunctional cyclocarbonate and the at least one first multifunctional amine may be stirred. The stirring may be for several hours. The stirring may happen at room temperature. The reaction of the at least one multifunctional cyclocarbonate and the at least one first multifunctional amine may have an excess amount of the at least one first multifunctional amine. The reaction may yield amine-terminated NIPU oligomers.

The two-step process may have at least one multifunctional cyclocarbonate heated to a temperature of 30° C., 35° C., 40° C., 45° C., 50° C., 55° C., 60° C., 65° C., 70° C., 75° C., 80° C., 85° C., 90° C., or any range between these values. In some embodiments, the at least one multifunctional cyclocarbonate may be heated to a temperature of 60° C. At least one first multifunctional amine may be added to the at least one multifunctional cyclocarbonate. In some embodiments, water may be added to the at least one first multifunctional amine before adding the at least one multifunctional amine to the at least one multifunctional cyclocarbonate in a manor such that the cyclocarbonate is (at least initially) in stoichiometric excess. The mixture of the amine and cyclocarbonate may react for 1 minute, 2 minutes, 3 minutes, 4 minutes, 5 minutes, 6 minutes, 7 minutes, 8 minutes, 9 minutes, 10 minutes, 11 minutes, 12 minutes, 15 minutes, 20 minutes, 30 minutes, 45 minutes, 60 minutes, or any range between these values. In some embodiments, the mixture of the amine and cyclocarbonate may react for 10 minutes. In the second step, an additional amount of the at least one first multifunctional amine may be added to the mixture of the amine and carbonate to create a final mixture that has a stoichiometric excess amount of the amine. In some embodiments, a second multifunctional amine may be added to the mixture of the amine and carbonate to create a final mixture. The final mixture may be mixed. The final mixture may also be heated. The final mixture may undergo an exothermic reaction. The final mixture may be cooled to yield an NIPU oligomer. The NIPU oligomer may be amine-terminated.

In some embodiments, the multifunctional cyclocarbonates and NIPU oligomers may be liquid at room temperature. In other embodiments, the multifunctional cyclocarbonates and NIPU oligomers may be liquid at temperatures at slightly above room temperature, such as 30-40° C. When the multifunctional cyclocarbonates and NIPU oligomers are liquid at these temperatures, it helps to facilitate handling without the need for solvents. Alternatively, the NIPU oligomers may be selected to be soluble in an economical solvent such as water that does not need to be removed to make a foam. For example, using bisphenol F diglycidyl carbonate to prepare the NIPU oligomers and the use of slight heating (e.g. heating to a temperature of 30-50° C.) resulted in an oligomer that was semisolid at room temperature and readily miscible with water and additional amine. Similarly, multifunctional carbonates and epoxy compounds can be selected to be soluble or miscible with acrylate diluents, which can solubilize and/or reduce viscosity to facilitate handling at room temperature.

The method of making a foam may include providing a formulation that has a first part (part A) and a second part (part B). The first part may have at least one multifunctional acrylate. The first part may have 25% to 70% of at least one multifunctional acrylate.

The second part may have at least one NIPU oligomer derived from a reaction of at least one multifunctional cyclocarbonate and at least one first multifunctional amine. In some embodiments, the second part may also have a second multifunctional amine. The at least one first multifunctional amine and the second multifunctional amine may be the same multifunctional amine. In some embodiments, the at least one first multifunctional amine may be different than the second multifunctional amine.

The method of making a foam may include combining the first part and the second part of the formulation to create a froth. At least one of the first part and the second part may be heated to a temperature of 25° C. to 60° C. At least one of the first part and the second part may be heated to a temperature of 25° C., 30° C., 35° C., 40° C., 45° C., 50° C., 55° C., 60° C., or any range between these values.

The method of making a foam may include curing the froth to produce a foam. The method of making a foam may have a step growth reaction for the step of curing. The step of curing the froth may be aza Michael addition, anhydride-amine addition, amine-epoxy addition, or carbonate-amine addition. Aza Michael addition is a fast step growth reaction and carbonate-amine addition is a relatively slow step growth reaction.

The method of making a foam may form the froth using a pressurized system, static mixers, impingement mixing, heated dispensing systems, simple hand mixing, or combinations thereof. The method of making a foam may be initially at room temperature.

The froth is cured to create a solidified matrix surrounding or encasing the cellular structure of the plurality of cells to create the foam. The temperature of the mixture or froth may be elevated in a controlled fashion to help control the rate of the curing reaction, as well as potentially extending the curing reaction. Typically, the curing is exothermic, so that the temperature of the system will rise after mixing. The curing may be 10 seconds, 20 seconds, 30 seconds, 40 seconds, 50 seconds, 1 minute, 2 minutes, 3 minutes, 4 minutes, or any range between these values. In some embodiments, the foam may be tack free in 2 minutes or less. In other embodiments, the foam may be tack free in 2 minutes, 110 seconds, 100 seconds, 90 seconds, 80 seconds, 70 seconds, 60 seconds, 50 seconds, 40 seconds, 30 seconds, 20 seconds, 10 seconds, or any range between these values.

Foam

The foam may be a reaction product of the methods described above. The foam may have a density of less than or equal to 5 pcf (80.09 kg/m$^3$). In some embodiments, the foam may have a density of 0.25, 0.5, 1.0, 1.1, 1.2, 1.3, 1.4, 1.5, 1.6, 1.65, 1.66, 1.67, 1.68, 1.69, 1.75, 1.8, 1.85, 1.9, 1.95, 2, 2.5, 3, 3.5, 4, 4.5, 5 pcf, or any range between these values. The foam may have a density of less than or equal to 2 pcf (32.04 kg/m$^3$). For protective packaging (e.g., cushioning) applications, lower densities are preferred. Unless otherwise noted, the density of the foam as used herein is the apparent density measured according to ASTM D1622-08, which is incorporated herein in its entirety by reference.

The foam may have a compressive strength of 2 psi to 20 psi at 10% strain. The foam may have a compressive strength of 3 psi to 10 psi at 10% strain. In some embodiments, the foam may have a compressive strength of at least any of the following: 2.0, 2.25, 2.5, 2.75, 3.0, 3.25, 3.5, 3.75, 4.0, 4.25, 4.5, 4.75, 4.8, 4.9, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 12, 14, 15, 16, 18, 20 psi, or any range between these values. As used herein, the compressive strength is measured according to ASTM 1621-00, as modified by reference to 10% strain.

The foam may have a configuration, for example, of any of a sheet, plank, slab, block, board, and molded shape. The foam may be a solid foam. The foam may be used for any one or more of void fill, blocking or bracing, thermal insulation, cushioning, package cushioning, sound insulation or vibration dampening.

In preferred embodiments, the formulations used to make the foam are free of isocyanate reactants, such as those used in formulating polyurethane foams, so that the final foam of the present disclosure is free from isocyanates or isocyanate residues.

Any numerical value ranges recited herein include all values from the lower value to the upper value in increments of one unit provided that there is a separation of at least 2 units between any lower value and any higher value. As an example, if it is stated that the amount of a component or a value of a process variable (e.g., temperature, pressure, time) may range from any of 1 to 90, 20 to 80, or 30 to 70, or be any of at least 1, 20, or 30 and/or at most 90, 80, or 70, then it is intended that values such as 15 to 85, 22 to 68, 43 to 51, and 30 to 32, as well as at least 15, at least 22, and at most 32, are expressly enumerated in this specification. For values that are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. The definitions and disclosures set forth in the present Application control over any inconsistent definitions and disclosures that may exist in an incorporated reference. All references to ASTM tests are to the most recent, currently approved, and published version of the ASTM test identified, as of the priority filing date of this application. Each such published ASTM test method is incorporated herein in its entirety by this reference.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

EXAMPLES

Example 1: Preparation of Multifunctional Cyclocarbonates

Multifunctional cyclocarbonates were prepared using two methods: high pressure method and low pressure method. An example of the high pressure method had 100 g of trimethylolpropane triglycidyl ether and 1.06 g tetrabutylammonium bromide added to the glass liner of a 300 cc Parr reactor. The reactor was equipped with mechanical stirring, heating mantle, stir shaft cooling, and a $CO_2$ pressure system. The vessel was purged with 3 volumes of $CO_2$ and the temperature was raised to 145° C. under 400 psi of $CO_2$ pressure. The conditions were maintained for 24 hours. The resulting crude yield of liquid carbonate was 126 g.

An example of the low pressure method had 150 g trimethylolpropane triglycidyl ether and 1.0 g tetrabutylammonium iodide added to a 250 mL 3-necked round bottomed flask equipped with a magnetic stirrer and an oil bubbler. Carbon dioxide was bubbled into the liquid at nominally atmospheric pressure. The temperature was raised with a heating mantle to 130° C. for 28 hours. Carbonate conversion was determined to be greater than 97% by FTIR.

Example 2: Preparation of Amine-Terminated NIPU Oligomers

Amine-terminated NIPU oligomers were prepared using a one-step process and a two-step process. For an example of the one-step process: 50 g of TMPTGC and 94 g of meta-xylenediamine (MXDA, 1:6 mol ratio) was added to a magnetically stirred flask. The mixture was stirred for 2 hours at room temperature. The resulting product was an oligomer in a liquid-gel state. A similar oligomer was prepared with a 1:7 mol ratio of IPDA.

For an example of the two-step process: 42.437 g trimethylolpropane triglycidyl carbonate (TMPTGC) was added to a flask equipped with a condenser. The flask with the TMPTGC was warmed to 60° C. A mixture of 8.5 g isophoronediamine (IPDA) and 25 g water was added to the TMPTGC and allowed to react for 10 minutes, after which 42.5 g of IPDA was added. The temperature was set to 80° C. and the mixture exothermed to 97° C. The reaction was cooled after 20 minutes. The resulting product was an oligomer in a liquid-gel state.

Example 3: Method of Making Foam

Parts A and B of the foam formulations were typically mixed by hand for several minutes. Part A and B were then mixed mechanically at high speed for 30 seconds typically or less, if creaming was observed (onset of bubble formation). Foams were allowed to rise and cure. Foams were conditioned for at least 24 hours at room temperature and 50% relative humidity prior to determining density and compressive strength in accordance with ASTM D3574-11. In some cases, as indicated, foams were warmed by placing the container in a warm water bath during mixing and rise time. Amounts in the tables below represent parts by weight. Table 1 below provides a description for acronyms used throughout the examples' tables.

TABLE 1

| Acronym/Tradename | Description |
|---|---|
| Epon 863 | Bisphenol F diglycidyl ether |
| SR399 | Dipentaerythritol pentaacrylate |
| SR351H | trimethylolpropane triacrylate |
| DPHA | Dipentaerythritol hexaacrylate |
| TMPTGC | Trimethylolpropane triglycidyl carbonate |
| IPDA | Isophorone diamine |
| MXDA | Meta-xylenediamine |
| TMPTGC:MXDA oligomer 1:6 | Reaction product of TMPTGC with 6 equivalents MXDA |
| TMPTGC:IPDA oligomer 1:7 | Reaction product of TMPTGC with 7 equivalents IPDA |
| TMPTGC:IPDA 1:3 (2 step) | Reaction product of TMPTGC with 3 net equivalents IPDA carried out in two steps |
| Dabco DC 197 | Siloxane surfactant |
| DBU | 1,8-diazabicyclo[5.4.0]undec-7-ene |
| TBD | 1,5,7-Triazabicyclo[4.4.0]dec-5-ene |
| HFC 245fa | 1,1,1,3,3-pentafluoropropane |
| Solstice LBA | trans-1-chloro-3,3,3-trifluoropropene |
| TMPTE | Trimethylolpropane triglycidyl ether |
| AATMP | Trimethylolpropane trisacetoacetate |

TABLE 2

| | Sample 1 | | Sample 2 | | Sample 3 | |
|---|---|---|---|---|---|---|
| Components | Part A % | Part B % | Part A % | Part B % | Part A % | Part B % |
| Epon 863 | 12.00 | | 12.00 | | 13.20 | |
| TMPTGC | 12.00 | | 12.00 | | 13.20 | |
| SR399 | 30.00 | | 30.00 | | 33.00 | |
| IPDA | | 20.00 | | 20.00 | | 20.00 |
| TMPTGC:MXDA 1:6 | | 24.00 | | 24.00 | | 24.00 |
| Dabco DC 197 | 1.25 | 1.25 | 1.25 | 1.25 | 1.25 | 1.25 |
| NaHCO3 | 2.00 | | 2.00 | | 2.00 | |
| DBU | | | | 3.33 | | 4.00 |
| TBD | | 3.33 | | | | |
| water | | 3.00 | | 3.00 | | 3.00 |
| HFC-245fa | 25.00 | 6.00 | 25.00 | 6.00 | 25.00 | 6.00 |
| Rise time (min.) | 3.5 | | 3.5 | | 3.0 | |
| Mix ratio (wt.) | 1.43 | 1 | 1.43 | 1 | 1.51 | 1 |
| Density (pcf) | 1.8 | | 1.9 | | 1.6 | |
| Compressive strength @ 10% strain | 3.65 | | 5.50 | | 5.62 | |
| 25% strain | 4.66 | | 5.82 | | 5.69 | |
| 50% strain | 8.64 | | 10.45 | | 9.22 | |

Samples 1-3 in Table 2 show the effect that catalysts can have on foam density and compressive strength. Samples 1-3 are low density foams that have good compressive strength; however, the rise time is too long for a good on demand packaging foam.

TABLE 3

| | Sample 4 | | Sample 5 | | Sample 6 | |
|---|---|---|---|---|---|---|
| Components | Part A % | Part B % | Part A % | Part B % | Part A % | Part B % |
| Epon 863 | 7.50 | | 7.50 | | 7.50 | |
| SR399 | 45.00 | | 45.00 | | 45.00 | |
| IPDA | | 22.00 | | 22.00 | | 22.00 |
| TMPTGC:MXDA 1:6 | | 26.00 | | 26.00 | | 26.00 |
| Dabco DC 197 | 1.25 | 1.25 | 1.25 | 1.25 | 1.25 | 1.25 |
| NaHCO3 | 2.00 | | 2.00 | | 2.00 | |
| DBU | | 3.33 | | 3.33 | | 3.33 |
| boric acid | | | 0.85 | | 0.85 | |
| water | | 6.00 | | 6.00 | | 6.00 |
| HFC-245fa | 25.00 | 6.00 | 25.00 | 6.00 | 25.00 | 6.00 |
| Mix ratio (wt.) | 1.25 | 1 | 1.20 | 1 | 1.20 | 1 |
| Rise time (min.) | 1.5 | | 1.5 | | 2.5 | |
| Density (pcf) | 1.7 | | 2.2 | | 2.5 | |
| Compressive strength @ 10% strain | 3.62 | | 7.47 | | 7.16 | |
| 25% strain | 6.69 | | 8.16 | | 7.38 | |
| 50% strain | 10.07 | | 11.03 | | 8.49 | |

Samples 4-6 in Table 3 show that low density foams can be produced without the use of TMPTGC that have quicker rise time and good compressive strength. Shorter rise time is beneficial for on-demand packaging foams.

TABLE 4

| | Sample 7 | | Sample 8 | | Sample 9 | |
|---|---|---|---|---|---|---|
| Components | Part A % | Part B % | Part A % | Part B % | Part A % | Part B % |
| Epon 863 | 6.08 | | 6.08 | | | |
| SR351H | | | | 18.00 | 30.00 | |
| SR399 | 36.45 | | 18.00 | | 9.00 | |
| IPDA | | 26.40 | | 26.40 | | 26.40 |
| TMPTGC:IPDA 1:3 (2 step) | | 34.80 | | 34.80 | | 34.80 |

TABLE 4-continued

|  | Sample 7 | | Sample 8 | | Sample 9 | |
| --- | --- | --- | --- | --- | --- | --- |
| Components | Part A % | Part B % | Part A % | Part B % | Part A % | Part B % |
| Dabco DC 197 | 1.25 | 1.25 | 1.25 | 1.25 | 1.25 | 1.25 |
| NaHCO3 |  | 2.00 |  | 2.00 |  | 2.00 |
| water |  |  |  | 6.00 |  | 6.00 |
| HFC-245fa | 25.00 | 6.00 | 25.00 | 6.00 | 25.00 | 6.00 |
| Mix ratio (wt.) | 1 | 1.05 | 1 | 1.06 | 1 | 1.11 |
| Rise time (min.) | n/a | | 2.5 | | 2 | |
| Density (pcf) | 1.88 | | 1.96 | | 1.90 | |
| Compressive strength @ 10% strain | 8.66 | | 12.0 | | 3.99 | |
| 25% strain | 8.17 | | 13.89 | | 2.59 | |
| 50% strain | 8.81 | | 15.11 | | 2.77 | |

The NIPU oligomer was produced in a two-step procedure in order to create a branched structure in samples 7-9. These samples further show that some TMPTA can be used to increase compressive strength with minimal impact on density; however, higher levels can be detrimental.

TABLE 5

|  | Sample 10 | | Sample 11 | | Sample 12 | |
| --- | --- | --- | --- | --- | --- | --- |
| Components | Part A % | Part B % | Part A % | Part B % | Part A % | Part B % |
| Epon 863 | 7.50 |  | 7.00 |  | 9.50 |  |
| SR351H |  |  |  |  | 27.00 |  |
| SR399 | 45.00 |  | 54.00 |  |  |  |
| DPHA |  |  |  |  | 28.50 |  |
| IPDA |  | 22.00 |  | 26.00 |  | 27.00 |
| TMPTGC:MXDA 1:6 |  | 26.00 |  | 31.20 |  | 32.00 |
| Tegostab B 84906 |  |  |  |  | 1.67 | 1.25 |
| Dabco 197 | 1.70 | 1.25 | 1.50 | 1.50 |  |  |
| NaHCO3 |  | 2.00 |  | 2.40 |  | 2.50 |
| water |  | 6.00 |  | 7.20 |  | 7.60 |
| HFC-245fa | 25.00 | 6.00 |  |  | 31.35 | 7.00 |
| Solstice LBA |  |  | 30.00 | 7.20 |  |  |
| Mix ratio (wt.) | 1.25 | 1 | 1.23 | 1 | 1.27 | 1 |
| Rise time (min.) | 2.5 | | 2 | | 1.5 | |
| Density (pcf) | 1.50 | | 1.82 | | 1.78 | |
| Compressive strength @ 10% strain | 4.46 | | 4.07 | | 7.82 | |
| 25% strain | 6.73 | | 5.09 | | 8.59 | |
| 50% strain | 7.46 | | 5.67 | | 13.24 | |

Components were warmed in a 48° C. water bath during mixing and the rise time for samples 10-12. The thermal conductivity of sample 12 was measured and found to be 29.2 mW/m·K, which gives a corresponding R-value of 4.9 per inch. Sample 10-12 foams would be useful in insulation applications. Thermal conductivity was measured using a Transient Plane Source TPS 2200, which provides transient measurement of absolute Thermal Conductivity, thermal diffusivity and specific heat. Hot disk TPS devices measure thermal conductivity in accordance to ISO/DUS 22007-2.2.

TABLE 6

|  | Sample 13 | | Sample 14 | | Sample 15 | |
| --- | --- | --- | --- | --- | --- | --- |
| Components | Part A % | Part B % | Part A % | Part B % | Part A % | Part B % |
| Epon 863 | 9.50 |  | 9.50 |  | 9.50 |  |
| SR351H |  |  | 14.00 |  | 14.00 |  |
| DPHA | 57.00 |  | 42.75 |  | 42.75 |  |
| IPDA |  | 27.00 |  | 27.00 |  | 27.00 |
| TMPTGC:MXDA 1:6 |  | 32.00 |  | 32.00 |  | 32.00 |
| Dabco DC 197 | 2.15 | 1.60 | 2.15 | 1.60 |  |  |
| Tegostab B 84906 |  |  |  |  | 1.67 | 1.25 |
| NaHCO3 |  | 2.50 |  | 2.50 |  | 2.50 |
| water |  | 7.60 |  | 7.60 |  | 7.60 |
| HFC-245fa | 31.35 | 7.00 | 31.35 | 7.00 | 31.35 | 7.00 |
| Mix ratio (wt.) | 1.29 | 1 | 1.28 | 1 | 1.10 | 1 |
| Rise time (min.) | 1.5 | | 1.5 | | 2 | |
| Density (pcf) | 2.15 | | 2.08 | | 1.74 | |
| Compressive strength @ 10% strain | 10.8 | | 3.11 | | 7.61 | |
| 25% strain | 11.4 | | 5.16 | | 8.18 | |
| 50% strain | 15.2 | | 10.3 | | 11.92 | |
| Thermal conductivity (mW/m · K) | 25.3 | | 28.9 | | 28.6 | |
| R-value per inch | 5.7 | | 5.0 | | 5.0 | |

Samples 13-15 show low-density foams of good compressive strength that have low thermal conductivities suitable for insulation applications.

TABLE 7

|  | Sample 16 | | Sample 17 | | Sample 18 | |
| --- | --- | --- | --- | --- | --- | --- |
| Components | Part A % | Part B % | Part A % | Part B % | Part A % | Part B % |
| Epon 863 | 29.4 |  | 29.4 |  | 29.4 |  |
| SR351H |  |  | 21.67 |  | 43.34 |  |
| SR399 |  |  | 154.8 |  | 132.3 |  |
| DPHA | 176.5 |  |  |  |  |  |
| IPDA |  | 83.6 |  | 83.6 |  | 83.6 |
| TMPTGC:MXDA 1:6 |  | 99.1 |  | 99.1 |  | 99.1 |
| Tegostab B 84906 | 3.2 | 1.55 | 3.2 | 1.55 | 3.2 | 1.55 |
| NaHCO3 |  | 7.74 |  | 7.74 |  | 7.74 |
| water |  | 23.53 |  | 23.53 |  | 23.53 |
| HFC-245fa | 85 | 20 | 97.1 | 21.67 | 97.1 | 21.67 |

Samples 16-18 in Table 7 were NIPU foam formulations used to mold 2" cushions for drop testing in accordance with ASTM D5276-98. The mold consisted of a plywood box with a shaped insert for the load cell. The box was lined with HDPE film to form a typical cushion. For comparison, 2" cushions were molded from Instapak GFlex, an isocyanate based commercially available on-demand packaging foam.

A load cell was packaged in the two-inch molded cushions and loaded with a given static load as shown below. The cushion was packaged in a standard corrugated cardboard box and dropped from a height of 30 inches. Transmitted G forces were recorded for five consecutive drops with a 1 minute recovery period in between.

TABLE 8

| 2" cushions 30" drop height | Static load (PSI) | Drop 1 (G's) | Drop 2 (G's) | Drop 3 (G's) | Drop 4 (G's) | Drop 5 (G's) | Average (G's) Drops 2-5 |
| --- | --- | --- | --- | --- | --- | --- | --- |
| GFlex | 0.8 | — | 41 | 43 | 44 | 44 | 43.0 |
| GFlex | 1.2 | — | 34 | 38 | 40 | 44 | 39.0 |
| Sample 16 | 0.8 | 36.1 | 37.4 | 38.1 | 40.5 | 46.4 | 44.3 |

TABLE 8-continued

| 2" cushions 30" drop height | Static load (PSI) | Drop 1 (G's) | Drop 2 (G's) | Drop 3 (G's) | Drop 4 (G's) | Drop 5 (G's) | Average (G's) Drops 2-5 |
|---|---|---|---|---|---|---|---|
| Sample 16 | 1 | 33.8 | 39.5 | 45.6 | 57.8 | 71.8 | 49.2 |
| Sample 17 | 1 | 40.3 | 74.6 | 165.5 | 280.7 | 326.6 | 211.8 |
| Sample 18 | 1 | 31.5 | 77.6 | 161.4 | 263.7 | 343.0 | 211.4 |

The drop test data in Table 8 for sample 16 shows that these NIPU foams can be formulated to compare favorably with commercially available on-demand packaging foams (GFlex); however, samples 17 and 18 failed resulting in extremely high transmitted shock values. It is believed that the brittle nature of the network formed in these foams resulted in failure upon multiple drops, although initial cushioning was good.

Example 4: Foam Formulations

Several other foam formulations were prepared using the method previously discussed in Example 3. These foam formulations were tested for compressive strength and the foams' density was measured.

TABLE 9

|  | Sample 19 | | Sample 20 | | Sample 21 | | Sample 22 | |
|---|---|---|---|---|---|---|---|---|
| Components | Part A % | Part B % | Part A % | Part B % | Part A % | Part B % | Part A % | Part B % |
| Epon 863 |  |  |  |  | 14.8 |  |  |  |
| SR399 | 30.3 |  | 30.3 |  | 36.9 |  | 30.3 |  |
| TMPTGC | 36 |  | 36 |  | 14.8 |  | 36% |  |
| TMPTGC:MXDA oligomer 1:6 |  | 41.68 |  |  |  | 37.3 |  |  |
| TMPTGC:IPDA oligomer 1:7 |  |  |  | 43.97 |  |  |  | 40.83 |
| IPDA |  | 34.73 |  |  |  | 31.1 |  | 36.1 |
| MXDA |  |  |  | 31.15 |  |  |  |  |
| Dabco DC197 | 1.5 | 2.17 | 1.5 | 2.29 | 3.36 | 4.66 | 1.5 | 2.13 |
| DBU |  | 5.78 |  | 6.1 |  | 13.0 |  | 5.65 |
| Sodium bicarbonate | 2.4 |  | 2.4 |  | 2.24 |  | 2.4 |  |
| water |  | 5.21 |  | 5.5 |  | 4.66 |  | 5.1 |
| HFC 245fa | 30 | 10.42 | 30 | 11 | 28.0 | 9.32 | 30 | 10.2 |
| Mix ratio (wt.) | 1.45 | 1 | 1.52 | 1 | 1.40 | 1 | 1.42 | 1 |
| Density (pcf) | 1.6 | | 1.6 | | 2.0 | | 2.0 | |
| Compressive strength @ 10% strain (psi) | 0.4 | | 0.45 | | 1.26 | | 0.84 | |

Samples 19-22 in Table 9 illustrate low density, non-isocyanate foam with low to moderate compressive strength. Samples 19-22 displayed good resiliency and low compression set.

Samples 23-25 in Table 10 below illustrate low density foams with high compressive strength suitable for packaging applications.

TABLE 10

|  | Sample 23 | | Sample 24 | | Sample 25 | |
|---|---|---|---|---|---|---|
| Components | Part A % | Part B % | Part A % | Part B % | Part A % | Part B % |
| Epon 863 | 9.29 |  |  |  | 9.29 |  |
| SR399 | 55.7 |  | 66.1 |  | 55.7 |  |
| TMPTGE |  |  |  |  |  |  |
| TMPTGC:MXDA oligomer 1:6 |  | 40.3 |  | 41.7 |  | 42.2 |
| TMPTGC:IPDA oligomer 1:7 |  |  |  |  |  |  |
| IPDA |  | 34.1 |  | 34.7 |  | 35.7 |
| MXDA |  |  |  |  |  |  |
| Dabco DC197 | 1.55 | 1.94 | 1.50 | 2.17 | 1.55 | 2.03 |
| DBU |  | 5.16 |  | 5.78 |  | .41% |
| Sodium bicarbonate | 2.48 |  | 2.40 |  | 2.48 |  |
| water |  | 9.29 |  | 5.21 |  | 4.87 |
| HFC 245fa | 31.0 | 9.29 | 30.0 | 10.4 | 31.0 | 9.74 |
| Mix ratio (wt.) | 1.25 | 1 | 1.45 | 1 | 1.31 | 1 |

TABLE 10-continued

|  | Sample 23 | | Sample 24 | | Sample 25 | |
|---|---|---|---|---|---|---|
| Components | Part A % | Part B % | Part A % | Part B % | Part A % | Part B % |
| Rise time (min) | 1.5 | | 2.5 | | 2.5 | |
| Density (pcf) | 1.7 | | 2.1 | | 1.9 | |
| Compressive strength @ 10% strain (psi) | 6.42 | | 11.79 | | 5.67 | |

Samples 26-28 are listed in Table 11 below.

TABLE 11

|  | Sample 26 | | Sample 27 | | Sample 28 | |
|---|---|---|---|---|---|---|
| Components | Part A % | Part B % | Part A % | Part B % | Part A % | Part B % |
| Epon 863 | 12.00 | | 12.00 | | 10.80 | |
| SR351H | 23.00 | | 23.00 | | 20.70 | |
| SR508 | 15.00 | | 15.00 | | 13.50 | |
| TMPTGC | 12.00 | | 10.00 | | 9.00 | |
| SR399 | 28.00 | | 28.00 | | 25.20 | |
| AATMP | | | 12.00 | | 10.80 | |
| MXDA | | 16.67 | | 12.00 | | 10.80 |
| Bis F DGE:MXDA 1:5 | | | | 28.00 | | 25.20 |
| TMPTGC:MXDA 1:6 | | 27.00 | | 30.00 | | 27.00 |
| Bis F DC:MXDA 1:5 | | 24.00 | | | | |
| Dabco DC197 | 3.00 | 3.00 | 3.00 | 3.00 | 2.70 | 2.70 |
| NaHCO3 | 2.00 | | 2.00 | | 1.80 | |
| DBU | | | | | | 2.00 |
| water | | 6.00 | | 6.00 | | 5.40 |
| HFC-245fa | 25.00 | 16.50 | 25.00 | 16.50 | 22.50 | 8.00 |
| Rise time (min.) | n/a | | n/a | | 2.5 | |
| Mix ratio (wt.) | 1.29 | 1 | 1.36 | 1 | 1.44 | 1 |
| Density (pcf) | 2.3 | | 2.6 | | 1.9 | |
| Compressive strength @ 10% strain | 0.36 | | 3.4 | | 0.6 | |
| Compressive strength @ 25% strain | 0.45 | | 3.5 | | 0.85 | |
| Compressive strength @ 50% strain | 0.71 | | — | | 1.53 | |

Sample 26 in Table 11 utilized a NIPU oligomer prepared from bis phenol F diglycidyl carbonate. The foam was low density, very soft, and resilient. Sample 27 utilized an amine-terminated oligomer prepared from bis phenol F diglycidyl ether and AATMP. It is believed that AATMP can participate in several types of addition reactions including carbon Michael and imine formation. Sample 27 was somewhat higher in density with good compressive strength. Sample 28 included DBU as a catalyst and was low density, soft, and resilient.

Example 5: Additional Foam Formulations

Additional foam formulations were prepared using the method previously discussed in Example 3.

TABLE 12

|  | Sample 32 | | Sample 33 | | Sample 34 | |
|---|---|---|---|---|---|---|
| Components | Part A % | Part B % | Part A % | Part B % | Part A % | Part B % |
| Epon 863 | 12 | | 13.5 | | 12 | |
| SR351H | 23 | | 25.8 | | 23 | |
| SR508 | 15 | | 16.8 | | 15 | |
| TMPTGC | 12 | | | | 12 | |
| SR399 | 28 | | 31.5 | | 28 | |
| MXDA | | 16.67 | | 16.67 | | 14.2 |
| TMPTGC:MXDA 1:6 | | 58 | | 58 | | |
| Bis F DC:MXDA 1:5 | | | | | | 49.4 |
| Dabco DC197 | 3 | 3 | 3 | 3 | 3 | 3 |
| NaHCO3 | 2 | | 2 | | 2 | |
| HFC-245a | 25 | 16.5 | 25 | 16.5 | 25 | 16.5 |
| water | | 6 | | 6 | | 6 |
| Mix ratio (A/B) | | 1.08 | | 1.08 | | 1.35 |
| Density (pcf) | | 2.9 | | 5.7 | | 5.2 |
| Compressive strength @ 10% strain | | 0.48 | | 0.48 | | 7.94 |
| Compressive strength @ 25% strain | | 0.64 | | 1.91 | | 8.83 |
| Compressive strength @ 50% strain | | 1.02 | | 3.19 | | n/a |

Samples 32-34 used aza Michael addition and aza epoxy addition to cure the froth. Sample 32 was a new control formulation that had little shrink upon cure (2.9 pcf). Sample 33 had no tricarbonate in part A and had a lot of shrink (5.7 pcf). Sample 34 uses Bis F DC:MXDA oligomer and also had a lot of shrink (5.2 pcf).

TABLE 13

|  | Sample 35 | | Sample 36 | |
|---|---|---|---|---|
| Components | Part A % | Part B % | Part A % | Part B % |
| Epon 863 | 12 | | 12 | |
| SR351H | | | | |
| SR508 | 15 | | 15 | |
| TMPTGC | 12 | | 12 | |
| SR399 | 28 | | 28 | |
| AATMP | 20 | | 15 | |
| MXDA | | 12 | | 10 |
| TMPTGC:MXDA 1:6 | | 30 | | 30 |
| Bis F DC:MXDA 1:5 | | | | |
| Dabco DC197 | 3 | 3 | 3 | 3 |
| NaHCO3 | 2 | | 2 | |
| DBU | | 2.5 | | 2.5 |
| water | | 6 | | 6 |
| HFC-245fa | 25 | 16.5 | 25 | 16.5 |
| Mix ratio (A/B) | | 0.94 | | 1.07 |
| Density (pcf) | | 2.5 | | 2.5 |
| Compressive strength @ 10% strain | | 7.5 | | 6.1 |
| Compressive strength @ 25% strain | | 6.8 | | 5.8 |
| Compressive strength @ 50% strain | | 8 | | 6.4 |

Sample 35 had a lower A/B mix ratio at 0.94, was expanded to 700 cc, then shrunk to 650 cc, 2.5 pcf. Sample 36 used less AATMP, was expanded to 600 cc, shrunk to 590 cc, 2.5 pcf.

TABLE 14

|  | Sample 37 | | Sample 38 | |
|---|---|---|---|---|
| Components | Part A % | Part B % | Part A % | Part B % |
| Epon 863 | 12 | | 12 | |
| SR508 | 15 | | 15 | |
| TMPTGC | 10 | | | |

TABLE 14-continued

| Components | Sample 37 Part A % | Sample 37 Part B % | Sample 38 Part A % | Sample 38 Part B % |
|---|---|---|---|---|
| SR399 | 28 | | 28 | |
| AATMP | 12 | | | |
| MXDA | | 12 | | 12 |
| TMPTGC:MXDA 1:6 | | 30 | | 30 |
| Bis F DGE:MXDA 1:5 | | 28 | | 28 |
| Dabco DC197 | 3 | 3 | 3 | 3 |
| NaHCO3 | 2 | | 2 | |
| water | | 6 | | 6 |
| HFC-245fa | 25 | 16.5 | 25 | 16.5 |
| Mix ratio (A/B) | 0.72 | | 0.71 | |
| Density (pcf) | 2.5 | | n/a | |
| Compressive strength @ 10% strain | 1 | | n/a | |
| Compressive strength @ 25% strain | 1.1 | | n/a | |
| Compressive strength @ 50% strain | 1.6 | | n/a | |

Samples 37 and 38 had low mix ratios at 0.72 and 0.71, respectively. Sample 37 was expanded to 900 cc and had little shrink (2.5 pcf). Sample 38 was expanded to 600 cc and had no shrink. Sample 38 was too soft to cut and no compressive strength was obtained.

TABLE 15

| Components | Sample 39 Part A % | Sample 39 Part B % | Sample 40 Part A % | Sample 40 Part B % | Sample 41 Part A % | Sample 41 Part B % |
|---|---|---|---|---|---|---|
| Epon 863 | 12 | | 12 | | 12 | |
| SR351H | 23 | | | | 23 | |
| SR508 | 15 | | 15 | | 15 | |
| TMPTGC | 12 | | 12 | | 10 | |
| SR399 | 28 | | 28 | | 28 | |
| AATMP | | | 12 | | 12 | |
| MXDA | | 16.67 | | 15 | | 12 |
| TMPTGC:MXDA 1:6 | | 27 | | 30 | | 30 |
| Bis F DGE:MXDA 1:5 | | | | | | 28 |
| Bis F DC:MXDA 1:5 | | 24 | | | | |
| Curezol 2E4MZ | | 2 | | | | 2 |
| Dabco DC197 | 3 | 3 | 3 | 3 | 3 | 3 |
| NaHCO3 | 2 | | 2 | | 2 | |
| DBU | | | | 2 | | |
| HFC-245a | 25 | 16.5 | 25 | 16.5 | 25 | 16.5 |
| water | | 6 | | 6 | | 6 |
| Mix ratio (A/B) | 1.2 | | 0.97 | | 1.03 | |
| Density (pcf) | 2.7 | | 2.5 | | 3.1 | |
| Compressive strength @ 10% strain | 0.73 | | 3.93 | | 1.01 | |
| Compressive strength @ 25% strain | 0.93 | | 4.26 | | 1.82 | |
| Compressive strength @ 50% strain | 1.55 | | n/a | | 2.2 | |

Sample 39 used a mixture of two different NIPU oligomers in Part A and Curezol 2E4MZ and was expanded to 900 cc, shrunk to 800 cc, 2.7 pcf. Sample 40 used AATMP and had a lower A/B ratio than samples 39 and 41. Sample 40 was expanded to 700 cc and shrunk to 600 cc, 2.5 pcf. Sample 41 used Bis F DGE:MXDA oligomer with Curezol 2E4MZ. Sample 41 was expanded to 1100 cc and shrunk to 700 cc upon cure, 3.1 pcf.

TABLE 16

| Components | Sample 42 Part A % | Sample 42 Part B % | Sample 43 Part A % | Sample 43 Part B % | Sample 44 Part A % | Sample 44 Part B % |
|---|---|---|---|---|---|---|
| Epon 863 | 12 | | 12 | | 12 | |
| SR508 | 15 | | 15 | | | |
| TMPTGC | 12 | | 12 | | 12 | |
| SR399 | 30 | | 30 | | 30 | |
| IPDA | | | | | | 20 |
| MXDA | | 12 | | 12 | | |
| TMPTGC:IPDA 1:7 | | 24 | | 26 | | |
| TMPTGC:MXDA 1:6 | | 24 | | | | 24 |
| Bis F DGE:IPDA 1:5 | | | | 26 | | |
| Dabco DC197 | 3 | 3 | 3 | 3 | 3 | 3 |
| NaHCO3 | 2 | | 2 | | 2 | |
| DBU | | 2.5 | | 2.5 | | 2.5 |
| HFC-245a | 25 | 6 | 25 | 6 | 25 | 6 |
| water | | 3 | | 3 | | 3 |
| Rise time (mins) | 3 | | 3 | | 2 | |
| Mix ratio (A/B) | 1.01 | | 1.02 | | 1.02 | |
| Density (pcf) | 2.7 | | 2.7 | | 2.6 | |
| Compressive strength @ 10% strain | 0.63 | | 0.87 | | 3.18 | |
| Compressive strength @ 25% strain | 1.43 | | 1.66 | | 4.26 | |
| Compressive strength @ 50% strain | 2.79 | | 1.79 | | 5.15 | |

Sample 42 used IPDA and MXDA based NIPU oligomers and samples 43-44 used only IPDA oligomers. Sample 43 used more catalyst and sample 44 did not use SR508. Sample 43 was expanded to 420 cc and shrunk to 380 cc, 2.7 pcf. Sample 44 was expanded to 410 cc and shrunk to 400 cc, 2.7 pcf Sample 45 was expanded to 350 cc and shrunk to 330 cc, 2.6 pcf Sample 44 had much greater compressive strength.

TABLE 17

| Components | Sample 45 Part A % | Sample 45 Part B % | Sample 46 Part A % | Sample 46 Part B % | Sample 47 Part A % | Sample 47 Part B % |
|---|---|---|---|---|---|---|
| Epon 863 | 12 | | 12 | | 12 | |
| SR508 | 15 | | 15 | | 15 | |
| TMPTGC | 12 | | 12 | | 12 | |
| SR399 | 30 | | 30 | | 30 | |
| AATMP | 12 | | 12 | | 12 | |
| MXDA | | 14 | | 14 | | 14 |
| TMPTGC:MXDA 1:6 | | 30 | | 30 | | 30 |
| Dabco DC198 | | | 3 | 3 | | |
| Dabco DC197 | 3 | 3 | | | | |
| NaHCO3 | 2 | | 2 | | 2 | |
| DBU | | 2 | | 2 | | 2 |
| Tegostab B 8221 | | | | | 3 | 3 |
| HFC-245a | 25 | 6 | 25 | 6 | 25 | 6 |
| water | | 2 | | 3 | | 3 |
| Rise time (mins) | 3 | | 2 | | 1.5 | |
| Mix ratio (A/B) | 1.03 | | 1.03 | | 1.03 | |
| Density (pcf) | 3.0 | | 3.9 | | 3.9 | |
| Compressive strength @ 10% strain | 5.56 | | 4.62 | | 2.68 | |
| Compressive strength @ 25% strain | 6.1 | | 4.61 | | 2.99 | |
| Compressive strength @ 50% strain | n/a | | n/a | | 4.21 | |

Sample 45 used only 2% water and Dabco DC197 for a surfactant, sample 46 used 3% water and Dabco DC198 for a surfactant, and sample 47 used 3% water and Tegostab B 8221 for a surfactant. Sample 45 was expanded to 300 cc and shrunk to 250 cc, 3.0 pcf. Sample 46 was expanded to 190 cc, 2.7 pcf. Sample 47 was expanded to 200 cc, 3.9 pcf

TABLE 18

| Components | Sample 48 Part A % | Sample 48 Part B % | Sample 49 Part A % | Sample 49 Part B % | Sample 50 Part A % | Sample 50 Part B % |
|---|---|---|---|---|---|---|
| Epon 863 | 12 | | 12 | | 12 | |
| TMPTGC | 12 | | 12 | | 12 | |
| SR399 | 30 | | 30 | | 30 | |
| IPDA | | 20 | | 20 | | 20 |
| TMPTGC:MXDA 1:6 | | 24 | | 24 | | 24 |
| L-6900 | 3 | 3 | | | | |
| Dabco DC197 | | | | | 3 | 3 |
| NaHCO3 | 2 | | 2 | | 2 | |
| DBU | | 2.5 | | 2.5 | | 2.5 |
| L-6915 | | | 3 | 3 | | |
| HFC-245a | 25 | 6 | 25 | 6 | 25 | 6 |
| water | | 3 | | 3 | | 3 |
| Rise time (mins) | | | | | | |
| Mix ratio (A/B) | 1.02 | | 1.02 | | 1.02 | |
| Density (pcf) | 2.9 | | n/a | | 2.1 | |
| Compressive strength @ 10% strain | 9.52 | | n/a | | 5.25 | |
| Compressive strength @ 25% strain | 10.71 | | n/a | | 5.49 | |
| Compressive strength @ 50% strain | 12.92 | | n/a | | 5.71 | |

Sample 48 used L-6900 for a surfactant, sample 49 used L-6915 for a surfactant, and sample 50 acted as a control and used Dabco DC197 for a surfactant. Sample 48 was expanded to 350 cc and shrunk to 250 cc, 2.9 pcf. Sample 49 was expanded to 320 cc and collapsed to 100 cc. Sample 50 was expanded to 350 cc and shrunk to 340 cc, 2.1 pcf.

TABLE 19

| Components | Sample 51 Part A % | Sample 51 Part B % | Sample 52 Part A % | Sample 52 Part B % | Sample 53 Part A % | Sample 53 Part B % |
|---|---|---|---|---|---|---|
| Epon 863 | 13.2 | | 12 | | 12 | |
| TMPTGC | 13.2 | | 12 | | 12 | |
| SR399 | 33 | | 30 | | 30 | |
| IPDA | | 20 | | 20 | | 20 |
| TMPTGC:MXDA 1:6 | | 24 | | 24 | | |
| TMPTGC:IPDA 1:4 | | | | | | 39 |
| Dabco DC197 | 1.25 | 1.25 | 1.25 | 1.25 | 1.25 | 1.25 |
| NaHCO3 | 2 | | 2 | | 2 | |
| DBU | | 4 | | 4 | | 4 |
| HFC-245a | 25 | 6 | 25 | 6 | 25 | 6 |
| Dimethoxymethane | | | | 5 | | |
| water | | 3 | | 3 | | 3 |
| Rise time (mins) | 3.5 | | 3.5 | | 4.5 | |
| Mix ratio (A/B) | 1.12 | | 1.02 | | 1.02 | |
| Density (pcf) | 1.8 | | 2.1 | | 2.2 | |
| Compressive strength @ 10% strain | 3.67 | | 1.27 | | 8.92 | |
| Compressive strength @ 25% strain | 4.54 | | 2.23 | | 9.87 | |
| Compressive strength @ 50% strain | 8.69 | | 5.07 | | 10.01 | |

Sample 51 had a higher mix ratio than samples 52 and 53. Sample 52 had dimethoxymethane as an added blowing agent. Sample 51 was expanded to 410 cc and had good compressive strength. Sample 52 was expanded to 420 cc and had much lower compressive strength. Sample 53 was expanded to 350 cc and had excellent compressive strength.

TABLE 20

| Components | Sample 54 Part A % | Sample 54 Part B % | Sample 55 Part A % | Sample 55 Part B % |
|---|---|---|---|---|
| Epon 863 | 13.2 | | 13.2 | |
| TMPTGC | 13.2 | | 13.2 | |
| SR399 | 33 | | 33 | |
| IPDA | | 20 | | 20 |
| TMPTGC:MXDA 1:6 | | 24 | | 24 |
| Dabco DC197 | 1.25 | 1.25 | 1.25 | 1.25 |
| NaHCO3 | 2 | | 2 | |
| DBU | | 8.35 | | 4 |
| AlK(SO4)2*12H2O | | | | 3.4 |
| HFC-245a | 25 | 6 | 25 | 6 |
| water | | 3 | | |
| Rise time (mins) | 2.5 | | 2.5 | |
| Mix ratio (A/B) | 1.12 | | 1.12 | |
| Density (pcf) | 1.8 | | 2.18 | |
| Compressive strength @ 10% strain | 1.07 | | 0.92 | |
| Compressive strength @ 25% strain | 2.08 | | 1.84 | |
| Compressive strength @ 50% strain | 5.85 | | 5.54 | |

Sample 54 was expanded to 450 cc and shrunk to 420 cc, 1.8 pcf. Sample 55 was expanded to 420 cc and shrunk to 400 cc, 2.18 pcf.

TABLE 21

| Components | Sample 56 Part A % | Sample 56 Part B % | Sample 57 Part A % | Sample 57 Part B % | Sample 58 Part A % | Sample 58 Part B % |
|---|---|---|---|---|---|---|
| Epon 863 | 7.5 | | 7.5 | | 7.5 | |
| SR399 | 45 | | 45 | | 45 | |
| IPDA | | 22 | | 22 | | 22 |
| TMPTGC:MXDA 1:6 | | 26 | | 26 | | 26 |
| Dabco DC197 | 1.25 | 1.25 | 1.25 | 1.25 | 1.25 | 1.25 |
| NaHCO3 | 2 | | 2 | | 2 | |
| DBU | | 3.33 | | 3.33 | | 3.33 |
| HFC-245a | 25 | 6 | 25 | 6 | 25 | 6 |
| water | | 0.85 | | 6 | | 3 |
| Rise time (mins) | 2 | | 2 | | 1.5 | |
| Mix ratio (A/B) | 1 | | 1 | | 1 | |
| Density (pcf) | 1.9 | | 1.7 | | 2.0 | |
| Compressive strength @ 10% strain | 5.45 | | 4.21 | | 4.41 | |
| Compressive strength @ 25% strain | 5.04 | | 4.48 | | 7.1 | |
| Compressive strength @ 50% strain | | | 5.36 | | 11.37 | |

Sample 56 had less water at 0.85%, sample 57 had 6% water, and sample 58 had 3% water. All of these foams had high compressive strength.

TABLE 22

| Components | Sample 64 Part A % | Sample 64 Part B % | Sample 65 Part A % | Sample 65 Part B % | Sample 66 Part A % | Sample 66 Part B % |
|---|---|---|---|---|---|---|
| SR295 | 10.8 | | 31.5 | | 31.5 | |
| SR508 | 2.7 | | 7.9 | | 7.9 | |
| Bis A DGE | 70.6 | | 45.6 | | 45.6 | |
| Ancamine 2678 | | 17.3 | | 21 | | |
| DETA | | | | | | 18.2 |
| TMPTGC:2678 1:4 | | 11.5 | | 14.5 | | |
| Dabco DC193 | 6 | | 6 | | 1 | |
| Tegostab 8221 | | | | | 0.45 | |
| Garamite 1958 | | | | | 5 | |

TABLE 22-continued

| Components | Sample 64 Part A % | Sample 64 Part B % | Sample 65 Part A % | Sample 65 Part B % | Sample 66 Part A % | Sample 66 Part B % |
|---|---|---|---|---|---|---|
| HFC-245a | 15.7 | | 15 | | 15 | |
| Mix ratio (A/B) | 1.06 | | 1.07 | | 1.31 | |
| Density (pcf) | 37 | | 3.7 | | 9.7 | |
| Compressive strength @ 10% strain | n/a | | 7.02 | | n/a | |
| Compressive strength @ 25% strain | n/a | | 22.9 | | n/a | |
| Compressive strength @ 50% strain | n/a | | 30.3 | | n/a | |

Samples 64-66 had part B warmed for 10 minutes in 50° C. oven. Sample 64 was expanded to 40 cc, collapsed to 20 cc, 37 pcf. Sample 65 was expanded to 230 cc, collapsed to 150 cc, 3.7 pcf. Sample 66 was expanded to 60 cc, collapsed to 45 cc, 9.7 pcf.

TABLE 23

| Components | Sample 67 Part A % | Sample 67 Part B % | Sample 68 Part A % | Sample 68 Part B % | Sample 69 Part A % | Sample 69 Part B % |
|---|---|---|---|---|---|---|
| SR295 | 31.5 | | 31.5 | | 31.5 | |
| SR508 | 7.9 | | 7.9 | | 7.9 | |
| Bis A DGE | 45.6 | | 45.6 | | 45.6 | |
| Ancamine 2678 | | 21 | | 21 | | 21 |
| TMPTGC:2678 1:4 | | 14.5 | | 14.5 | | |
| TMPTGC:2678 1:5 | | | | | | 18.4 |
| Dabco DC193 | | 6 | | 6 | | 1 |
| Tegostab 8221 | | | | | | 0.45 |
| Water | | 6 | | | | 6 |
| HFC-245a | 15.7 | | 15 | 7 | 15 | |
| Mix ratio (A/B) | 1.07 | | 1.07 | | 0.98 | |
| Density (pcf) | 6.8 | | 31 | | 6.7 | |
| Rise time (sec.) | 40 | | 38 | | 30 | |
| Compressive strength @ 10% strain | 12.2 | | n/a | | 3.8 | |
| Compressive strength @ 25% strain | 15.6 | | n/a | | 11.1 | |
| Compressive strength @ 50% strain | 21.9 | | n/a | | 19.1 | |

Samples 67-69 had part B warmed for 10 minutes in 50° C. oven, which gave much quicker rise times. Sample 67 was expanded to 120 cc, collapsed to 115 cc, and had high compressive strength. Sample 68 was expanded to 80 cc, 31 pcf. Sample 69 was expanded to 150 cc, had little shrink, 6.7 pcf.

In conclusion, the above-mentioned samples shows the breadth of the ingredients and that relatively minor formulation changes can make dramatic changes in foam properties.

What is claimed is:

1. A method of making a foam, the method comprising:
providing a formulation comprising:
   a. a first part comprising 25% to 70% in relation to the first part of at least one multifunctional acrylate;
   b. a second part comprising:
      (i) 30% to 50% in relation to the second part of at least one non-isocyanate polyurethane oligomer derived from a reaction of at least one multifunctional cyclocarbonate and at least one first multifunctional amine, and
      (ii) 15% to 40% in relation to the second part of a second multifunctional amine;
   c. 5% to 35% in relation to the formulation of a blowing agent, wherein the blowing agent is included in at least one of the first part and the second part, and
   d. 0.1% to 7% in relation to the formulation at least one surfactant, wherein the at least one surfactant is included in at least one of the first part and the second part;
combining the first part and the second part of the formulation to create a froth; and
curing the froth to produce a foam the cured foam having a density of less than or equal to 2 pounds per cubic foot measured according to ASTM D1622-08 and a compressive strength of 3 pounds to 10 pounds per square inch measured according to ASTM 1621-00, as modified by reference to 10% strain;
wherein the first part is separated from the second part.

2. The method of claim 1, wherein the first part further comprises an epoxy compound, at least one multifunctional cyclocarbonate, and an anhydride compound.

3. The method of claim 1, wherein at least one of the first part and the second part is heated to a temperature of 25 to 60 degrees Celsius.

4. The method of claim 1, wherein the reaction of the at least one multifunctional cyclocarbonate and the at least one first multifunctional amine has an excess amount of the at least one first multifunctional amine.

5. The method of claim 1, wherein the step of curing the froth comprises at least one reaction selected from the group consisting of aza Michael addition, amine-epoxy addition, anhydride-amine addition, and carbonate-amine addition.

6. The method of claim 1, wherein the at least one multifunctional acrylate comprises at least one member selected from the group consisting of dipentaerythritol hexaacrylate, dipropylene glycol diacrylate, ditrimethylolpropane pentaacrylate, pentaerythritol tetraacrylate, polyethylene glycol (400) diacrylate, trimethylolpropane triacrylate, and tris (2-hydroxy ethyl) isocyanurate triacrylate.

7. The method of claim 6, wherein the at least one multifunctional acrylate is at least one of dipentaerythritol pentaacrylate and dipentaerythritol hexaacrylate.

8. The method of claim 1, wherein the at least one multifunctional cyclocarbonate is trimethylolpropane triglycidyl carbonate.

9. The method of claim 1, wherein the at least one first multifunctional amine comprises at least one member selected from the group consisting of isophorone diamine, meta-xylylenediamine, piperazine, 1-(2-aminoethyl)piperazine, diethylenetriamine, triethylenetetramine, tetraethylenepentamine, 2-methyl-1,5-pentanediamine, N,N'-bis-(3-aminopropyl)ethylenediamine, and 2,2,4-(and 2,4,4-) trimethylhexane-1,6-diamine.

10. The method of claim 1, wherein the second multifunctional amine comprises at least one member selected from the group consisting of isophorone diamine, meta-xylylenediamine, piperazine, 1-(2-aminoethyl)piperazine, diethylenetriamine, triethylenetetramine, tetraethylenepentamine, 2-methyl-L5-pentanediamine, N,N'-bis-(3-aminopropyl)ethylenediamine, and 2,2,4-(and 2,4,4-) trimethylhexane-1,6-diamine.

11. The method of claim 10, wherein the second multifunctional amine is isophorone diamine.

12. The method of claim 1, wherein the at least one first multifunctional amine is the same as the second multifunctional amine.

13. The method of claim 1, wherein the blowing agent comprises at least one member selected from the group consisting of acetone, carbon dioxide, dimethoxymethane, nitrogen, ammonium bicarbonate, potassium bicarbonate, sodium bicarbonate, hydrocarbons, hydrofluorocarbons, hydrofluoro olefins, and water.

14. The method of claim 13, wherein the blowing agent is at least one of a hydrofluorocarbon and a hydrofluoro olefin.

15. The method of claim 1, wherein the at least one surfactant is a silicon glycol copolymer.

16. The method of claim 1, further comprising an additive.

17. The method of claim 16, wherein the additive comprises at least one member selected from the group consisting of catalysts, flame retardants, foaming agents, reinforcing agents, nucleating agents, perfumes, and odor inhibitors.

18. The method of claim 1, wherein the foam is tack free in 2 minutes or less.

\* \* \* \* \*